Figure 1:
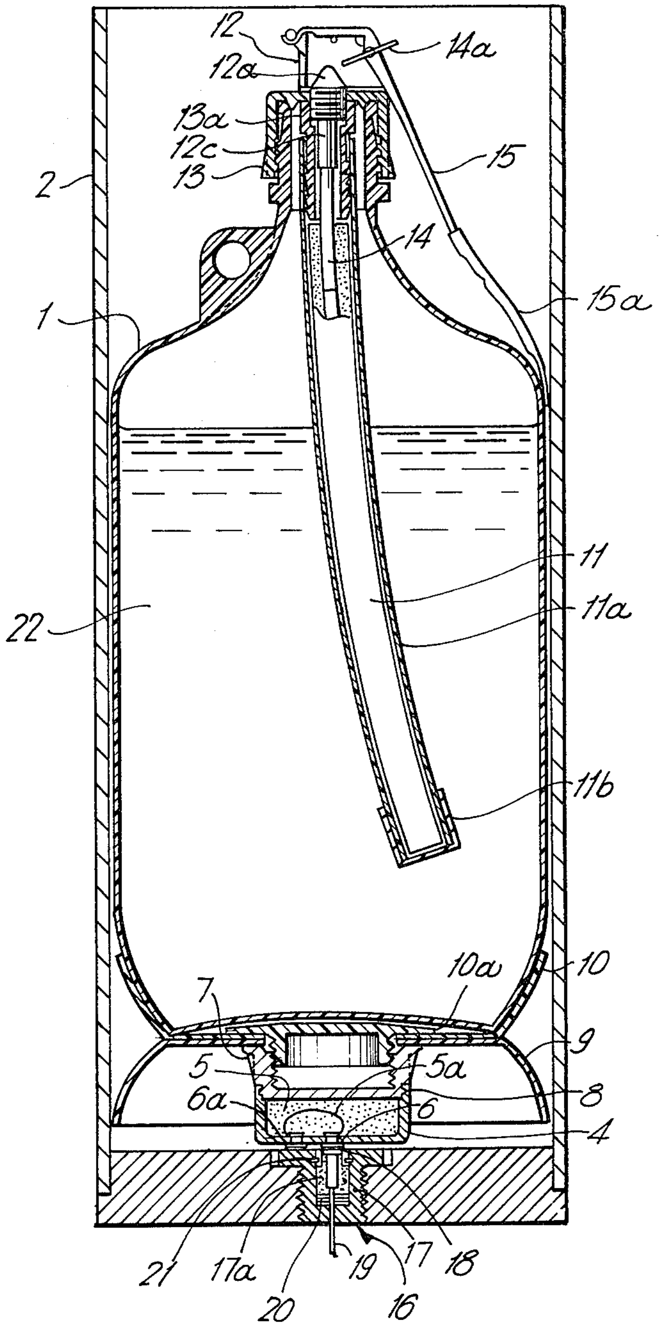

United States Patent [19]
Fenrick et al.
[11] 4,392,432
[45] Jul. 12, 1983

[54] AIR BURST MUNITIONS SIMULATOR

[75] Inventors: Walter J. Fenrick; Robert H. Chesney; Paul A. Mast, all of Medicine Hat, Canada

[73] Assignee: Her Majesty the Queen in right of Canada, as represented by the Minister of National Defence, Canada

[21] Appl. No.: 125,630

[22] Filed: Feb. 28, 1980

[30] Foreign Application Priority Data

Jul. 19, 1979 [CA] Canada .................................. 331921

[51] Int. Cl.³ .............................................. F42B 13/44

[52] U.S. Cl. .................................... 102/334; 102/364; 102/365; 102/355; 102/367; 102/466; 102/502; 102/275.11

[58] Field of Search .................. 102/65, 65.2, 66, 323, 102/334, 355, 365, 367, 466, 498, 502, 529, 364, 275.11

[56] References Cited

U.S. PATENT DOCUMENTS

| | | | |
|---|---|---|---|
| 1,892,050 | 12/1932 | Goss | 102/367 X |
| 2,742,856 | 4/1956 | Fieser et al. | 102/365 |
| 3,439,614 | 4/1969 | Schnepfe, Jr. | 102/367 X |
| 3,442,474 | 5/1969 | Miller et al. | 102/334 X |
| 3,726,225 | 4/1973 | Gerber et al. | 102/334 |
| 3,731,632 | 5/1973 | Stevens | 102/365 |
| 4,007,690 | 2/1977 | Wildridge | 102/334 X |

FOREIGN PATENT DOCUMENTS

| | | | |
|---|---|---|---|
| 2056632 | 3/1981 | United Kingdom | 102/334 |

*Primary Examiner*—Peter A. Nelson
*Attorney, Agent, or Firm*—Stevens, Davis, Miller & Mosher

[57] ABSTRACT

An air burst munitions simulator which provides for the aerial dissemination of readily dispersable substance. A payload container adapted to contain the substance to be dispersed is launched into the air by a propellant charge, typically gunpowder. A time delay fuse assembly serves to detonate a high energy explosive charge which shatters the container to release the dispersible substance in air.

5 Claims, 2 Drawing Figures

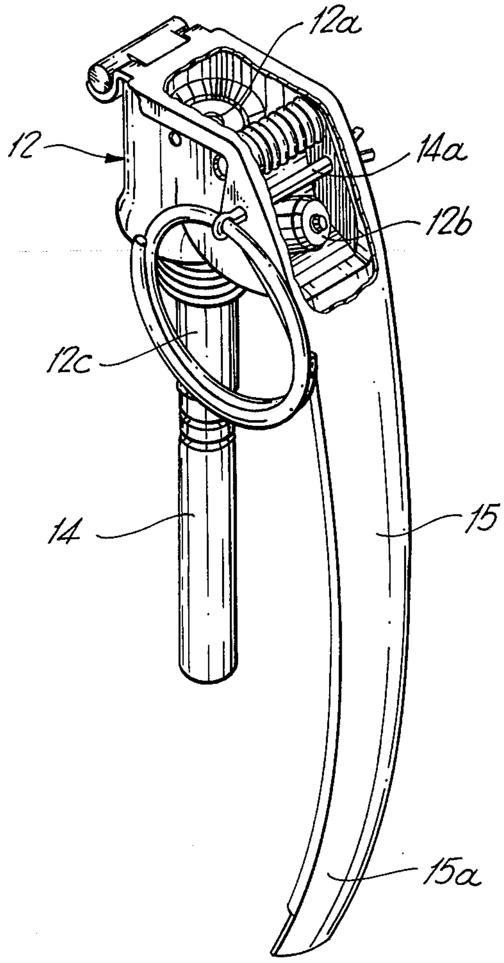
Fig-2-

AIR BURST MUNITIONS SIMULATOR

This invention relates to an improved air burst munitions simulator which provides for the aerial dissemination of readily dispersable substances e.g. powders and liquids.

Air burst munitions simulators have been previously described in applicant's co-pending Canadian Pat. Nos. 1,086,566, issued Sept. 30, 1980 and 1,097,966, issued Mar. 24, 1981.

Applicant has now improved upon these simulators by a. simplifying the launching system, b. increasing the safety element, and c. reducing the incidence of premature failure of the plastic container during launch.

According to the invention, an air burst munitions simulator for disseminating a readily dispersable substance in air is provided, comprising:

(a) payload container means of a suitable frangible plastics material adapted to contain a readily dispersable substance, (b) propellant charge means attached to said container to propel said container into the air, (c) ignition means for igniting said propellant charge, (d) burster charge means disposed within said container to shatter said frangible container to disseminate said readily dispersable substance in air, and (e) detonating means associated with said burster charge means for detonating said burster charge.

In the drawing,

FIG. 1 illustrates a simulator according to the invention located in a launcher barrel, and FIG. 2 is a perspective view illustrating the delay fuze assembly according to the invention.

In the drawing which serves to illustrate a preferred embodiment of the invention, a container means 1 is illustrated in firing position in an aluminum barrel 2 mounted on an aluminum launcher base 3. A typical launcher is specifically described in our co-pending Canadian Pat. No. 1,097,966.

With reference to FIG. 3 of Canadian Pat. No. 1,097,966, propellant charge capsule 64 and propellant retaining diaphragm 66 carried by the launcher barrel have been replaced by a propellant capsule 4 attached to the payload container 1. The propellant capsule 4 contains the propellant charge 5, 20–25 g of FFF black powder; ignition fuze wire **5*a* contacting propellant charge 5, typically of 0.004" tungsten; and electrical contacts 6 and 6*a* electrically connected by fuze wire 5*a*** e.g. pop rivets.

The propellant capsule 4 is attached to a obturator retainer 7 of the improved simulator. The obturator retainer 7 is shaped so that the bottom portion of it can slide into the propellant capsule 4. These two telescoping surfaces are interrupted by a bead 8 on the obturator retainer 7 that matches a groove in the matching surface of the propellant capsule 4. The relative dimensions of the bead and groove were adjusted until an internal pressure of 15 to 20 p.s.i. (gauge) was needed to cause separation of the components. Pairs of components which separated at lower pressures were tried but only those requiring the above pressure were considered to be assembled positively enough to survive field transport.

A threaded plastic reinforcement **10*a* is fixed to the bottom of container 1 e.g. by means of contact cement. The obturator retainer 7 is attached to the container 1 by threading onto plastic reinforcement 10*a* which rigidly holds the obturator 9 in place against the container. A second inverted obturator 10 can be added for additional structural strength. Alternatively, a threaded neck portion may be blow molded in the bottom of container 1 for receiving the obturator retainer 7**.

In the illustrated arrangement, the propellant charge 5 and burster explosive 11 have been separated so that the burning of the propellant charge no longer ignites the burster charge delay fuze as it did in the system described in Canadian Pat. No. 1,097,966. The delay fuze assembly 12 is now ignited by a center fire percussion cap **12*a*** provided by a newly adopted safety delay fuze unit. The safety delay fuze used is a component of the M26 grenade, used by the Canadian Armed Forces.

To adapt the M204A2 fuze to the simulator, a 9/16"×12 T.P.I. (threads per inch) threaded hole has to be made in the top of the heavy screw closure 13. The safety delay unit is threaded into the hole and the tubular high energy explosive burster charge 11 slipped over the detonator means 14. A plastic sheath **11*a*, and cap 11*b* typically of low density polyethylene, are provided to detect the burster charge from attack by the substance to be dispersed. A strain relief 13*a* is provided to prevent the burster explosive and the sheath and cap becoming detached from the ignitor assembly 14. The burster assembly is then inserted into the mouth of the container 1 and the screw closure 13 threaded on. The safety lever normally held in place by hand after the safety pin 14*a* has been removed is held in place by the aluminum barrel 2. The shape of the safety lever 15 had to be modified slightly and a special extension 15*a* was designed to extend the lever far enough so that it could be held securely between the container 1 and the aluminum barrel 2. After the container 1 has been inserted into the barrel 2, as shown in the figure, the safety pin 14*a*** is removed and the simulator is ready for launching.

The base 3 of the launcher tube has a central opening 16 in which an electrical contact housing 17 is located. It is seen that the housing 17 is threaded into the opening 16. Included within housing 17 is a teflon ® insulator **17*a* which retains an electrical terminal 18 which, when positioned, makes electrical contact with live contact 6 of the propellant capsule 4. The insulator 17*a* is mechanically biased by a compressed coil spring means 20, such that terminal 18 is maintained in electrical contact with contact 6. An internal metal retaining ring 21 serves to maintain positioning of housing 17 in opening 16. An electrical conductor 19 connected to terminal 18 carries an electric current from an appropriate detonation control unit (not shown) to ignite the propellant charge 5. The other electrical contact 6*a* is grounded against the housing 17**.

The container 1 is conveniently constructed of a suitable frangible light-weight plastics material, which is readily shattered by an explosive burster charge 11 carried within the container, to disseminate the payload i.e. a readily dispersable substance in powder or liquid form, in air. The container may be constructed of low-density polyethylene e.g. Nalgene ®. The narrow mouth four liter bottle is provided with a high-density polyethylene screw closure, which is more flexible than the conventional polypropylene screw closures. The obturator 9, obturator retainer 7, reinforcement **10*a*, propellant capsule 4, closure 13 and strain relief plug 13*a*** are also typically made of high-density polyethylene.

The burster charge 11 may be any suitable high energy explosive e.g. Detaprime ®, a high energy explosive comprising pentacrythritol tetranitrate (PETN) in an elastomeric binder.

The dispersable substance may be a powder or a liquid e.g. an aqueous dye solution for military training.

The simulator also provides a useful vehicle for application of liquid or powdered insecticide, fungicides, etc., to agricultural crops and otherwise inaccessible forest regions.

In operation the propellant charge 5 is ignited, the resulting gases cause the simulator to begin to rise and the propellant capsule 4 to separate from the obturator retainer 7. Combustion gases escaping from the propellant capsule 4 are trapped in a confined air space beneath the simulator and it begins to accelerate. The simulator subassembly begins to move upwards, and as the lower extremity of the safety lever 15 emerges from the barrel 2, the lever is flipped off by the spring loaded striker *12b* as it travels toward the percussion cap initiator *12a* (see FIG. 2). The center fire percussion cap initiator *12a* ignites the delay fuse *12c* which burns for about 4.5 seconds as the simulator gains altitude, then the detonator portion 14 of the delay fuze unit 12 explodes detonating the burster charge 11. It will be appreciated that the burning time of the fuze may be adjusted to control the time delay. The explosion disseminates the liquid or powdered training agent 22. The propellant capsule 4 remains in the barrel 2 and must be removed after each firing.

Incorporation of the M204A2 safety delay fuze into the simulator explosive train has made it safe enough to be transported fully assembled, which to date has been prohibited by safety regulations. In the arrangement described aforementioned Canadian Pat. No. 1,097,966, the burster charges, safety delay fuzes, propellant charges, fluid filled bottles, launch tubes, and other components were transported to the field separately and assembled into simulators just before launching.

In trials using the container illustrated in FIG. 3 of co-pending Canadian application Ser. No. 283,635, a number of mechanical failures, which occurred while the bottles were being accelerated inside the cardboard tubes, were reported. The failures were particularly evident during cold weather firings and the problem was finally traced to failure of the large polypropylene screw closures used in conjunction with the wide mouth bottles. Accordingly, a narrow mouthed bottle and improved closure 13 are now used.

It will be appreciated that the invention has been described in relation to the aerial dissemination of readily dispersible substances. However, it will be apparent to those skilled in the art that the invention may be used for purposes other than those described herein without departing from the spirit or central characteristics thereof. For example, the placement of explosive charges at specified locations e.g., on a glacier to initiate avalanches. Thus, the specific embodiment described herein is to be considered as illustrative and in no way restrictive.

We claim:

1. An air-burst munitions simulator for disseminating a readily dispersable substance in air, comprising (a) payload container means of a suitable frangible plastics material adapted to contain a readily dispersable substance, said payload container means including a convex obturator which when positioned in a barrel of a launcher defines a confined airspace to collect a cushion of gases resulting from the burning of said propellant charge, to push the simulator into the air, (b) propellant charge means attached to said container to propel said container into the air, (c) ignition means for igniting said propellant charge, (d) burster charge means disposed within said container to shatter said frangible container to disseminate said readily dispersable substance in air, and (e) detonating means associated with said burster charge means for detonating said burster charge.

2. An air-burst munitions simulator according to claim 1, wherein said propellant charge comprises 20–25 g FFF black powder and wherein said ignition means comprises a fuze wire adapted to be ignited electronically.

3. An air-burst munitions simulator according to claim 1, wherein said burster charge comprises a high-energy explosive and wherein said detonating means comprises a detonator activated by a time delay fuze means.

4. An air-burst munitions simulator according to claim 3, wherein said detonating means further comprises a spring loaded striker means for initiating a percussion cap means, said time delay fuze means being activated by said percussion cap means, wherein said striker means is held under spring tension a distance from said percussion cap by safety lever means, such that in the firing position in a launcher barrel said safety lever means is held under spring tension between the barrel and the container means and when the simulator exits the barrel, the safety lever is flipped off by the spring-loaded striker means to permit the striker means to strike and initiate the percussion cap means.

5. An air-burst munitions simulator according to claim 4, wherein said time delay is about 4.5 seconds.

* * * * *